United States Patent
Corso et al.

(10) Patent No.: US 7,246,975 B2
(45) Date of Patent: Jul. 24, 2007

(54) HOLE SAW WITH REPLACEABLE CUTTING TIP

(76) Inventors: Chris Corso, 17 W. 254 Byron, Bensenville, IL (US) 60106; Terry M. Corso, 13141 Powderhorn La., Apple River, IL (US) 61001

( * ) Notice: Subject to any disclaimer, the term of this patent is extended or adjusted under 35 U.S.C. 154(b) by 49 days.

(21) Appl. No.: 11/131,592

(22) Filed: May 18, 2005

(65) Prior Publication Data

US 2006/0263158 A1    Nov. 23, 2006

(51) Int. Cl.
*B23B 51/05* (2006.01)

(52) U.S. Cl. .................................. 408/206; 408/209

(58) Field of Classification Search ............. 408/204, 408/206, 207, 209, 703, 79, 80, 210; B23B 51/04, B23B 51/05
See application file for complete search history.

(56) References Cited

U.S. PATENT DOCUMENTS

| 72,436 | A | * | 12/1867 | Wippo | 408/189 |
|---|---|---|---|---|---|
| 239,056 | A | | 3/1881 | Overhiser | 404/204 |
| 248,033 | A | | 10/1881 | Gazeley | 408/204 X |
| 468,085 | A | | 2/1892 | Holcomb | 408/204 |
| 765,877 | A | | 7/1904 | Brownstein | |
| 1,145,822 | A | * | 7/1915 | Wilder | 408/186 |
| 1,310,319 | A | | 7/1919 | Baumann | 408/703 |
| 1,593,654 | A | | 7/1926 | Ermoshkin | 408/214 X |
| 2,610,529 | A | * | 9/1952 | Atkinson | 408/59 |
| 2,863,341 | A | * | 12/1958 | Rosato et al. | 408/59 |
| 2,869,405 | A | | 1/1959 | Wolfe | 408/703 X |
| 3,430,526 | A | | 3/1969 | Valenziano | 408/204 |
| 3,546,980 | A | * | 12/1970 | Lemanski | 408/189 |
| 3,548,687 | A | * | 12/1970 | Holloway | 408/206 |
| 3,610,768 | A | | 10/1971 | Cochran | 408/204 |
| 3,687,565 | A | | 8/1972 | Byers et al. | 408/201 |
| 3,860,354 | A | | 1/1975 | Hougen | 408/206 |
| 3,945,753 | A | | 3/1976 | Byers et al. | 408/201 |
| 4,057,357 | A | * | 11/1977 | Daghe et al. | 408/67 |
| 4,072,437 | A | | 2/1978 | Smith et al. | 408/204 X |
| 4,129,401 | A | * | 12/1978 | Berthier | 408/59 |

(Continued)

FOREIGN PATENT DOCUMENTS

DE           505530       8/1930   .................. 144/20

(Continued)

OTHER PUBLICATIONS

Tool and Manufacturing Engineers Handbook, Fourth Edition, vol. 1, Machining, Society of Manufacturing Engineers, Thomas J. Drozda, Editor in Chief, 1983, Chapter 9, pp. 48-49.*

(Continued)

*Primary Examiner*—Daniel W. Howell
(74) *Attorney, Agent, or Firm*—Olson & Hierl, Ltd.

(57) ABSTRACT

A device for cutting a hole, such as in sheet metal is provided. The device includes an axially rotatably cylindrical body that is operable with a rotatable drive. A distal end portion of the body includes a replaceable cutting tip and a replaceable pilot. The cutting tip is secured within a notch in the body and extends distally from the distal end portion. A shank portion is also provided which is adapted for securement within a rotational drive mechanism, such as a hand held drill.

10 Claims, 3 Drawing Sheets

U.S. PATENT DOCUMENTS

| | | | |
|---|---|---|---|
| 4,147,464 A | 4/1979 | Watson et al. | 408/703 X |
| 4,244,667 A | 1/1981 | Timmons | 408/201 |
| 4,322,188 A | 3/1982 | Hougen | 408/206 |
| 4,352,610 A | 10/1982 | Yankovoy et al. | 408/206 X |
| 4,353,670 A | 10/1982 | Jorgensen | 408/193 |
| 4,408,935 A | 10/1983 | Miyanaga | 408/206 |
| 4,422,812 A | 12/1983 | Linville | 408/204 |
| 4,490,080 A | 12/1984 | Kezran | 408/703 X |
| 4,500,234 A | 2/1985 | Orth et al. | 408/206 |
| 4,538,944 A | 9/1985 | Hougen | 408/206 |
| 4,556,347 A | 12/1985 | Barish | 408/230 |
| D282,369 S | 1/1986 | de Villiers | D15/139 |
| 4,573,838 A | 3/1986 | Omi et al. | 408/204 |
| 4,591,303 A * | 5/1986 | Sato et al. | 408/206 |
| 4,625,707 A | 12/1986 | Whittaker | 125/20 |
| 4,669,931 A | 6/1987 | Isaksson | 408/206 |
| 4,762,445 A * | 8/1988 | Bunting et al. | 408/144 |
| 4,992,009 A * | 2/1991 | Wallach | 408/67 |
| 5,049,010 A | 9/1991 | Oakes | 408/201 |

FOREIGN PATENT DOCUMENTS

| | | | |
|---|---|---|---|
| GB | 593622 | 10/1947 | 408/204 |
| JP | 2001293604 A * | 10/2001 | |
| JP | 2002292512 A * | 10/2002 | |

OTHER PUBLICATIONS

Advertisement for Carbide Tipped Hole Saws (Credo), 1989.
Advertisement for Jetbroach Cutters, 1983.

* cited by examiner

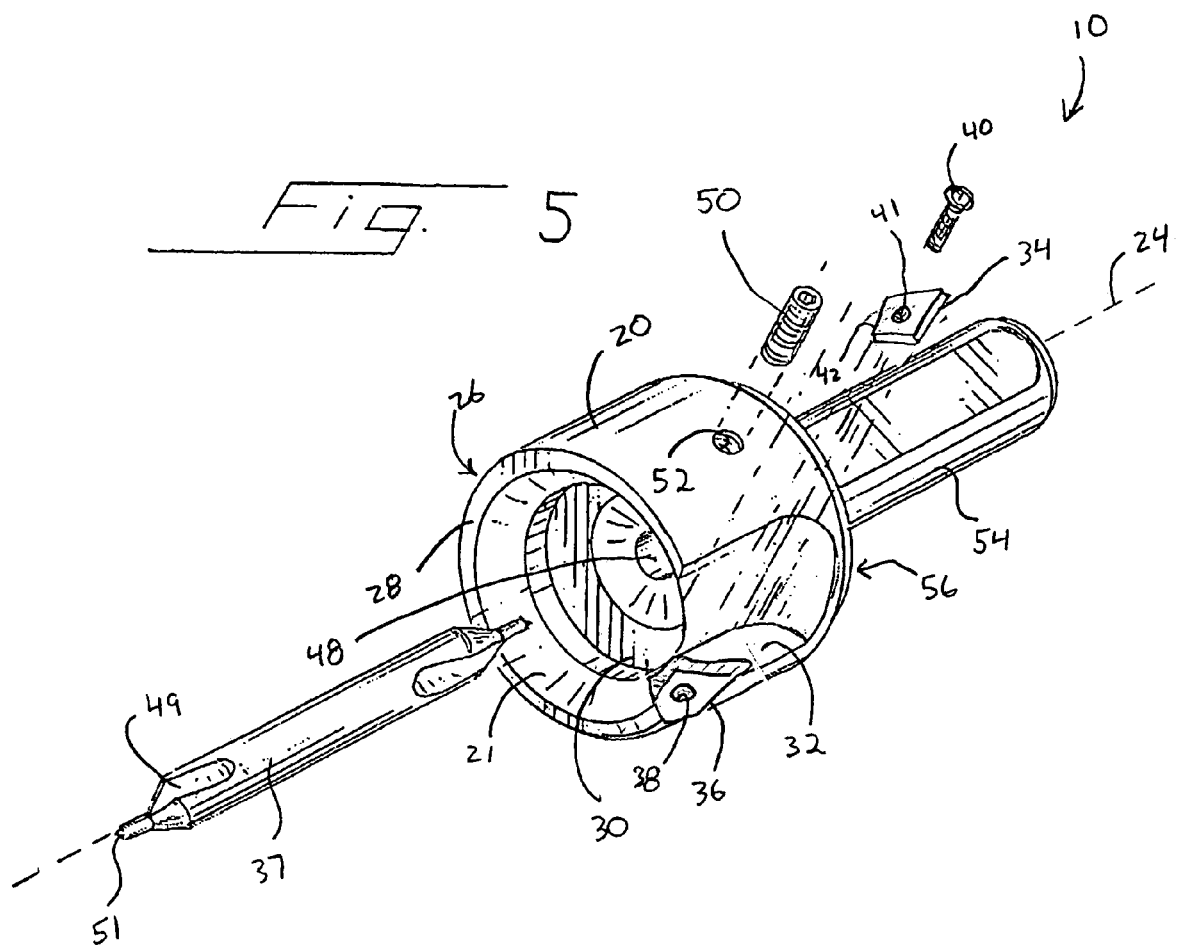

HOLE SAW WITH REPLACEABLE CUTTING TIP

TECHNICAL FIELD OF THE INVENTION

This invention relates to metal cutting tools and more particularly to a hole saw for cutting holes in material such as sheet metal using a hand held drill.

BACKGROUND OF THE INVENTION

Tools for cutting holes in various materials such as sheet metal generally fall into two types, those which operate by cutting or removing the entire interior area of a circle and those which operate by cutting only the circumferential area of a circle thereby producing an interior circular plug during the cutting operation. A conventional fluted drill is an example of the former type of tool. Such tools have the disadvantage of requiring substantially more cutting activity in order to produce the desired hole since the entire volume of the materia must be cut away to form the desired hole. Over a certain diameter, it is much more efficient and generally quicker to utilize a tool which cuts a circumferential circle for removing the metal as a plug. Such tools are generally known as trepanning tools. Tools of this type require substantially less cutting to achieve a desired hole and therefore provide large diameter holes quickly and with substantially less energy consumption.

The use of trepanning tools which cut only the circumferential area of circles to provide large diameter holes is known. Such tools generally comprise an elongated tubular cutting head having cutting blades or tips secured thereto which engage a work piece to shave or cut portions thereof to define the circumference of a circle upon rotation of the tool. Accordingly, as cutting of a work piece is effected, a center plug is produced which is received in the center area of the elongated tubular cutting head. Tools of this type have been available for cutting holes having diameters ranging from approximately less than an inch to holes having extremely large diameters for example up to 10 inches or more. Such large diameter trepanning tools are generally associated with lathe type machines which are fixedly mounted for producing holes in an automated fashion. Generally, such trepanning tools are therefore rigidly aligned with the material to be cut which is usually also clamped or fixed to prevent movement. While such applications are known in the art, there has been a continuing effort to produce tools suitable for use in a hand held fashion which will provide a relatively precise and smooth hole in thin sheet metal for use, for example, in field construction such as by an electrician in cutting holes in electrical boxes. In addition, it is desirable to cut holes in other types of sheet metal such as stainless steel, which is finding more use in home and building construction.

Various examples of hole cutting devices that are adapted for use with a hand held rotational drive mechanism, such as a hand held drill, exist. One type of hole saw is essentially a cylindrical tube having a leading edge with serrations or cutting teeth. Typically, a pilot drill bit that extends from the cylindrical tube is incorporated to act as a guide for aligning the hole saw. One problem with this type of hole saw is that the width of the teeth are more or less limited to the width of the cylindrical body of the hole saw, which is generally relatively thin. As a result, the serrations or cutting teeth are prone to breakage, which requires replacement.

Another example of a hole saw is found in U.S. Pat. No. 5,049,010, which discloses a hole saw that utilizes a single carbide tip permanently secured with a rotatable body. While such a hole saw has performed adequately, a serious drawback with such design is due to the fact that the only cutting edge, namely the carbide tip, is permanently secured or bonded to the body of the hole saw. When the carbide tip is worn, dulled, or broken, the entire hole saw must be replaced.

The present invention overcomes the shortcomings of the prior art and provides an effective device for cutting holes in metal.

SUMMARY OF THE INVENTION

The present invention is directed to a hole cutting device including a cylindrical body that is operable with a rotatable drive. The body defines an axis about which the body is rotated. A distal end portion of the body, which is the lead end of the device, is adapted to engages the material to be cut or drilled. The distal end portion further includes an interior defining a recess that extends away or proximally from the distal end of the body. The distal end portion also includes a notch cut into the body. Preferably, the notch does not penetrate through the body to the interior recess.

A cutting tip is detachably secured with the notch, and a portion of the cutting tip, such as a cutting edge, extends distally from the distal end of the body. The cutting tip is preferably mechanically secured with a socket formed within the notch in the body. For example, the cutting tip may be secured within the socket by a locking screw. The cutting tip also preferably includes a plurality of cutting edges. For example, the cutting tip is preferably triangular in shape whereby three cutting edges are defined. As a particular cutting edge becomes worn, the cutting tip may be disengaged from the body, and re-engaged with a fresh cutting edge protruding distally from the body.

Also extending from the distal end of the body is a pilot member, such as a drill bit. The pilot member is also detachably secured with the body along the axis and is adapted to align the cylindrical body with the material to be cut. A shank member integral with the body extends from a proximal end of the body along the axis. The shank member is adapted for engagement with a rotational drive, such as with the chuck of a hand held drill.

The cylindrical cutter body is substantially the diameter of the desired hole. The recess preferably includes a frusto-conical portion which tapers inwardly from the cutting end of the cutter body. The body further preferably includes an axially disposed bore extending therethrough for inclusion of the pilot member. The pilot member is preferably secured within the bore by a locking screw.

BRIEF DESCRIPTION OF THE DRAWINGS

In the drawings,

FIG. 5 is an exploded perspective view another alternate preferred embodiment of a hole cutting device according to the present invention.

DESCRIPTION OF THE PREFERRED EMBODIMENTS OF THE INVENTION

Figure 1:
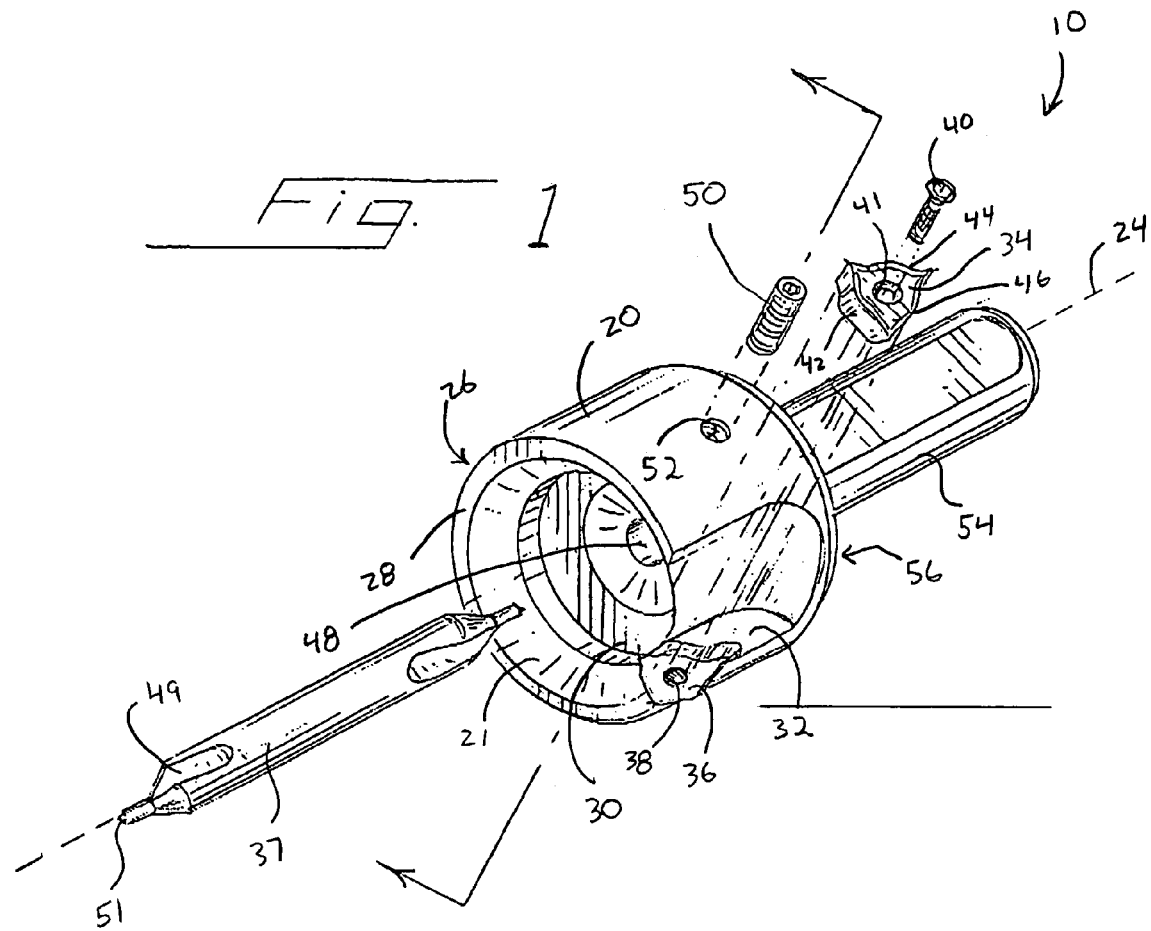
FIG. 1 is an exploded perspective view of a preferred embodiment of a hole cutting device according to the present invention.

The invention disclosed herein is susceptible of embodiment in many different forms. Shown in the drawings and described hereinbelow in detail are preferred embodiments of the invention. It is to be understood, however, that the present disclosure is an exemplification of the principles of the invention and does not limit the invention to the illustrated embodiments.

Figure 2:
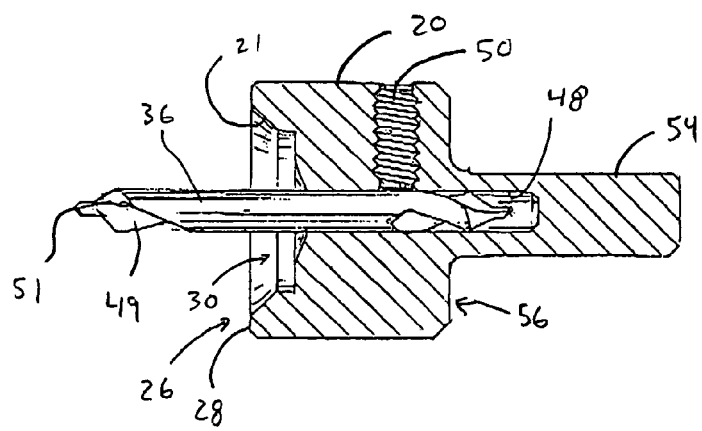
FIG. 2 is a cross sectional view of the hole cutting device of FIG. 1 taken across line 1-1.

Referring to FIGS. 1-2, a preferred embodiment of the hole cutting device of the present invention is shown. The hole cutting device 10 includes a cylindrical body 20 that is operable with a rotatable drive, such as a hand held drill (not shown). Device 10 is operated by rotating body 20 about an axis 24. Body 20 has a distal end portion 26, which is the lead end of the device. In other words, the distal end portion, and in particular, the distal end 28 of distal end portion 26 is adapted to engage the material to be cut or drilled. The distal end portion 26 also includes an interior defining a recess 30 that extends away from the distal end 28 of the body 20. The recess 30 preferably includes a frustoconical portion 21 which tapers inwardly from the distal end 28 of the cutter body 20.

The distal end portion 26 also includes a notch 32 cut away from the body 20. As shown, notch 32 is taken from the body 20, but does not extend through to recess 30 for the length of the body 20. The notch 32 provides for materials that are being cut to be directed away from the device 10. Because the notch 32 does not penetrate the recess 30 along the length of the body 20, the structural strength of the body 20 is maintained. The cylindrical cutter body is substantially the diameter of the desired hole to be cut.

A cutting tip 34 is detachably secured with the notch 32. In this example, a socket 36 that has a profile of substantially the same shape as the cutting tip 34 and is sized to accommodate the cutting 34 therein is provided. A threaded hole 38 is also formed within socket 36 to accept a fastener, such as locking screw 40. Screw 40 engages cutting tip 34 through hole 41 to secure cutting tip 34 with notch 32. Cutting tip 34 includes three cutting edges 42, 44, and 46. Cutting edge 42 is shown as being aligned such that it extends beyond distal end 28. As the distal end portion 26 of the device 10 engages the material to be drilled, the rotating cutting edge 42 cuts a hole.

When, through use, a cutting edge, such as edge 42 is dulled, the cutting tip 34 may be disengaged from notch 32, and realigned such that a new cutting edge, such as edge 44, extends beyond distal end 28. Alternatively, the cutting tip 34 may be replaced. While the cutting tip 34 is shown as being substantially triangular in shape, other profiles, such as square, rectangular, are also suitable. Some variance is also possible with respect to the size of hole to be cut. In other words, the cutting tip may extend radially from the body 20, such that a somewhat larger hole is cut.

The cutting tip is preferably composed of tungsten carbide such as industry code number C-10, and is preferably composed of micro fine grain tungsten cobalt carbide. Examples of suitable commercially available cutting tips are produced Interstate Tool Corporation, such as carbide insert part nos. DPMT21505 ICP22 55, CEHW-1204-AEER ICP222M, and APKT263PDTR ICP555M. Depending on the hardness or composition of the material to be cut, other suitable materials are also possible. For example, different cutting tips may be utilized to cut through ceramic tile, countertops, or the like.

A pilot member, such as drill bit 37, is also provided. Drill bit 37 is disposed within a bore 48 extending through the cutter body 20. Such a drill bit preferably includes a fluted section 49 and a pointed end 51. The drill bit 37 is essentially a standard drill bit utilized for cutting sheet metal. The drill bit 37 extends beyond the cutting tip 34 to allow the drill bit 37 to align the hole cutter 10 as desired. The pilot is secured in bore 48 by a locking screw 50, which is engageable with a recess 52, allowing removal of the pilot as necessary, such as due to breakage or wear. It is further preferred that drill bit 37 is double sided such that when one end is worn, it may be reversed.

A shank member 54 integral with the body 20 extends from a proximal end 56 of the body 20 along the axis 24. The shank member 54 is adapted for engagement with a rotational drive, such as with the chuck of a hand held drill. Preferably, the shank member 54 is of a sufficient length such that it may be fully seated within a chuck of a hand held drill.

Figure 3:
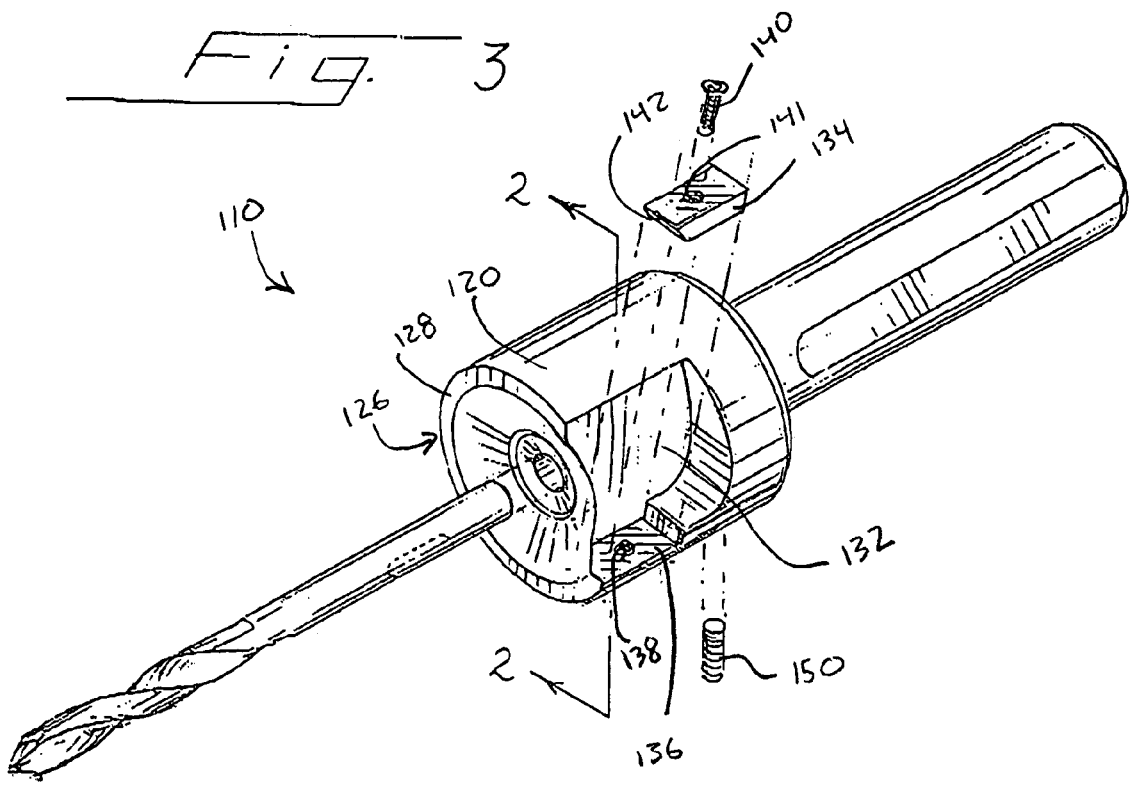
FIG. 3 is an exploded perspective view of an alternate preferred embodiment of a hole cutting device according to the present invention.
Figure 4:
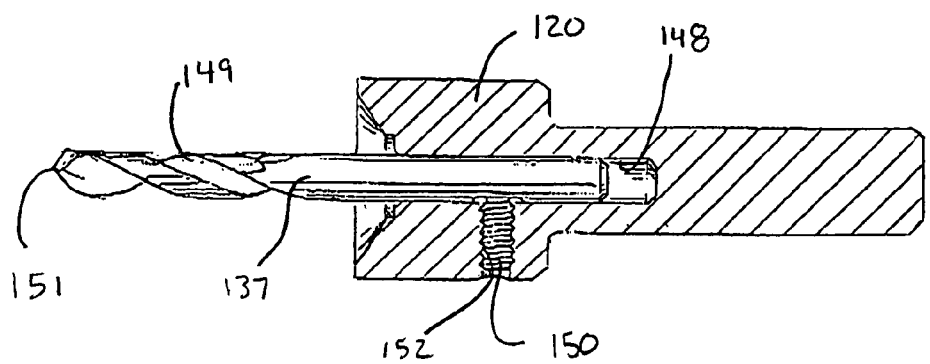
FIG. 4 is a cross sectional view of the hole cutting device of FIG. 3 taken across line 2-2.

Referring to FIGS. 3 and 4, an alternative embodiment of the present invention is shown. Device 110 is similar to the previous embodiment. Device 110 includes a cylindrical body 120 having a distal end portion 126, and a lead or distal end 128 which is adapted to engage the material to be cut or drilled. Notch 132 is formed in the body 120. In this embodiment, notch 132 includes a rectangular shaped socket 136 to accommodate cutting tip 134. As in the previous embodiment, cutting tip 134 is detachably secured within notch 132, and in particular, socket 136, by way of locking screw 140 which is guided through hole 141 and secured within threaded hole 138. Cutting tip 134 only includes one cutting edge 142. When through use, the cutting edge 142 is dulled, cutting tip 134 may be disengaged from socket 136, and replaced with a new cutting tip.

Also similar to the previous embodiment, device 110 includes a pilot member, such as drill bit 137 that is disposed within a bore 148 extending through the cutter body 120. The drill bit 137 is secured in bore 148 by a locking screw 150, which is engageable by way of threaded recess 152, and thereby allowing removal of the drill bit 137 as necessary, such as due to breakage or wear.

Referring to FIG. 5 is another embodiment of an alternative embodiment of the present invention. Device 210 includes a cylindrical body 220 having a distal end portion 226, and a lead or distal end 228. Notch 232 is formed in the body 220. In this embodiment, notch 232 includes a partial diamond shaped socket 236 to accommodate cutting tip 234. As in the previous embodiments, cutting tip 234 is detachably secured within notch 232, and in particular, socket 236, by way of locking screw 240 which is guided through hole 241 and secured within threaded hole 238. In this embodiment, cutting edge 242 provides a pointed cutting edge as opposed to a flat edge. A pilot member, such as drill bit 237, is also provided. Drill bit 237 is disposed within a bore 248 extending through the cutter body 220. Such a drill bit preferably includes a fluted section 249 and a pointed end 251, and is secured in bore 248 by a locking screw 250, which is engageable with a recess 252.

The foregoing descriptions are to be taken as illustrative, but not limiting. Still other variants within the spirit and scope of the present invention will readily present themselves to those skilled in the art.

What is claimed is:

1. A hole cutting device comprising:
   a body defining an axis and having a distal end portion terminating in a distal edge, the body having a substantially cylindrical exterior;

the distal end portion defining an interior, the interior defining a distal recess extending proximally from the distal edge, the distal end portion further defining a notch, wherein the notch extends less than the full length of the body in the axial direction of the body and extends farther in the axial direction than the distal recess;

a cutting tip detachably securable with said notch, a portion of the cutting tip extending distally from said distal edge;

a pilot member detachably secured with the body along said axis and extending from said distal end portion, said pilot member adapted to align the cylindrical body; and a shank member integral with the body; the shank member extending from a proximal end of the body along the axis, the shank member adapted for engagement with a rotational drive.

2. The hole cutting device of claim 1, wherein the detachable cutting tip defines a plurality of cutting edges.

3. The hole cutting device of claim 2, wherein the detachable cutting tip is substantially triangular in shape.

4. A device for cutting a hole in sheet metal, the device comprising:

a rotatable cylindrical body defining a longitudinal axis, the body having a lead edge portion and an engagement end portion;

the lead edge portion defining an interior recess defining a frustoconical portion, and a notch, wherein the notch extends less than the full length of the body in the axial direction and extends farther along the longitudinal axis of the body than the interior recess;

a pilot drill bit detachably secured within the interior recess along said axis and extending from the lead edge portion, said pilot drill bit adapted to align the cylindrical body;

a detachable cutting tip securable with the notch, a cutting edge of the cutting tip extending distally from said lead edge portion; and a shank member integral with the body; the shank member extending axially from the engagement end of the body, the shank member adapted for engagement with a rotational drive.

5. The hole cutting device of claim 4, wherein the detachable cutting tip defines a plurality of cutting edges.

6. The hole cutting device of claim 5, wherein the detachable cutting tip is substantially triangular in shape.

7. The hole cutting device of claim 2 wherein the detachable cutting tip can be realigned to present a new cutting edge.

8. The hole cutting device of claim 7 wherein the detachable cutting tip is realigned by rotation of the detachable cutting tip.

9. The hole cutting device of claim 5 wherein the detachable cutting tip can be realigned to present a new cutting edge.

10. The hole cutting device of claim 9 wherein the detachable cutting tip is realigned by rotation of the detachable cutting tip.

* * * * *